(12) United States Patent
Norimatsu et al.

(10) Patent No.: US 7,846,568 B2
(45) Date of Patent: Dec. 7, 2010

(54) POWER SUPPLY AND CONTROL METHOD THEREFOR

(75) Inventors: Yasuaki Norimatsu, Hitachi (JP); Akihiko Kanouda, Hitachinaka (JP); Mutsumi Kikuchi, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 1181 days.

(21) Appl. No.: 11/071,322

(22) Filed: Mar. 4, 2005

(65) Prior Publication Data

US 2006/0035115 A1 Feb. 16, 2006

(30) Foreign Application Priority Data

Aug. 16, 2004 (JP) ............................. 2004-236272

(51) Int. Cl.
*H01M 16/00* (2006.01)
*H01M 8/04* (2006.01)

(52) U.S. Cl. ............................. 429/9; 429/432; 429/429

(58) Field of Classification Search ....................... None
See application file for complete search history.

(56) References Cited

U.S. PATENT DOCUMENTS

2003/0111990 A1 6/2003 Miyauchi et al.
2003/0224224 A1* 12/2003 Okada et al. .................... 429/7
2003/0235724 A1* 12/2003 Ord et al. ....................... 429/19
2004/0076860 A1* 4/2004 Aso ............................ 429/23
2004/0202900 A1* 10/2004 Pavio et al. ..................... 429/9

FOREIGN PATENT DOCUMENTS

| CN | 1417917 A | 5/2003 |
|---|---|---|
| JP | A-50-116925 | 12/1975 |
| JP | 09-231991 | 9/1997 |
| JP | 2002-044807 | 2/2002 |
| JP | 2002-216818 | 8/2002 |
| JP | 2004-066917 | 3/2004 |

\* cited by examiner

*Primary Examiner*—Jonathan Crepeau
(74) *Attorney, Agent, or Firm*—Antonelli, Terry, Stout & Kraus, LLP.

(57) ABSTRACT

A power supply unit in a hybrid structure of a fuel cell and a power storage unit and a control method for the power supply unit, in which a small-size light-weight power storage unit is used and chances of incomplete functioning have been eliminated. In addition to the downsizing of the power storage unit and a reduction of the system price, it also becomes possible to start the fuel cell at high speed and raise the fuel cell temperature quickly, monitor output and remaining mounts of fuel and power, and take measures against fluctuations of output, and provides immediate availability of portable devices like the ones using a conventional secondary cell.

20 Claims, 18 Drawing Sheets

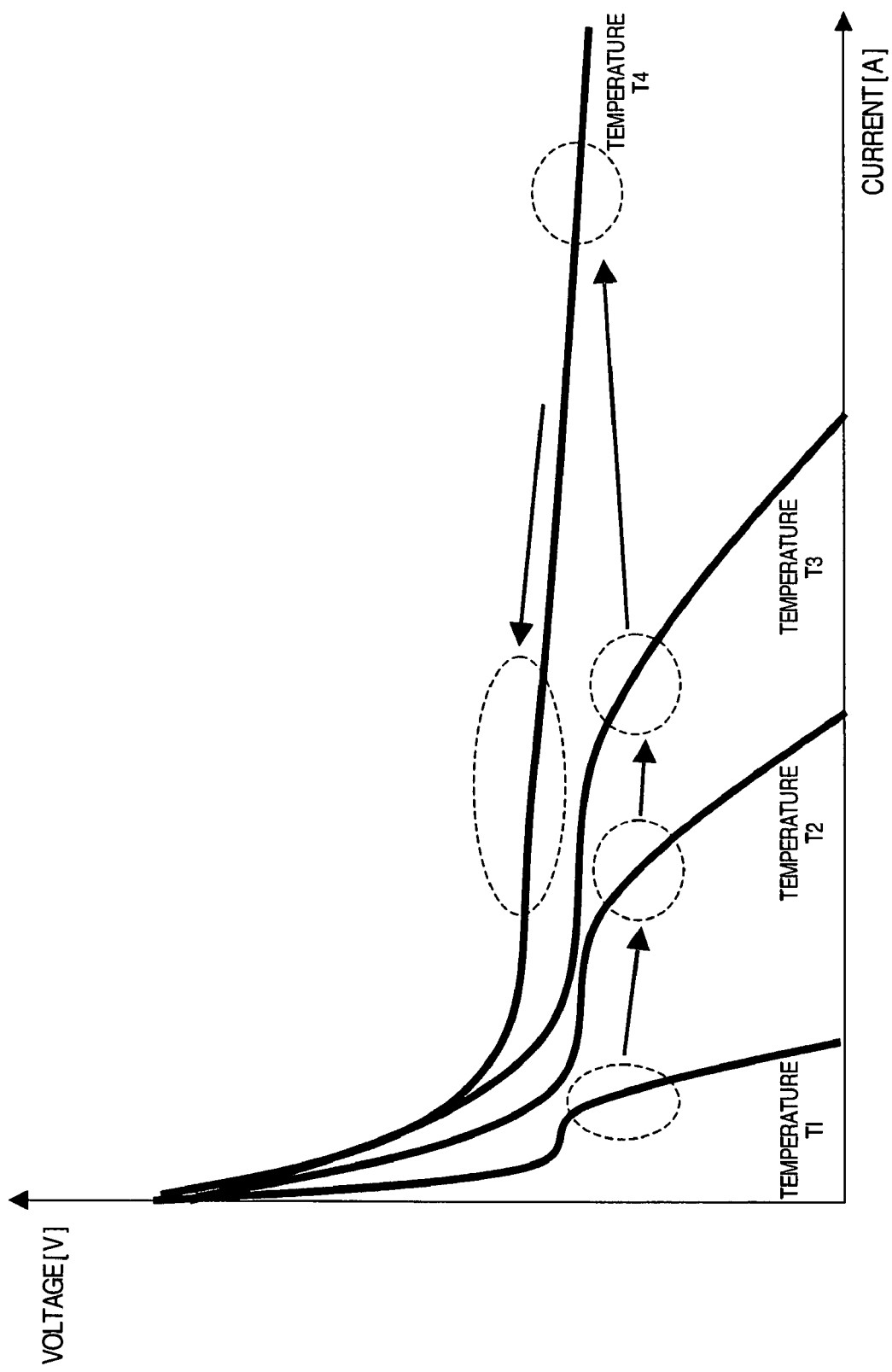

POWER SUPPLY AND CONTROL METHOD THEREFOR

BACKGROUND OF THE INVENTION

The present invention relates to a power supply unit using a fuel cell and a control method therefor.

Fuel cells are recently drawing attention as an electric power generator for its environment-friendliness and generally higher power generation efficiency than diesel-engine or gas-turbine generators.

However, unlike other types of power generators, the fuel cell, which generates power by chemical reaction, takes time before it starts working fully and is inferior in startability to other power generators.

JP-A-2004-66917 contains description pertaining to solving the problem of the startability in the case of the solid oxide fuel cell, more specifically, it states that a fuel cell and a secondary cell are provided, excess power is stored in the secondary battery, and stored power is used when starting the fuel cell, in an attempt to eliminate the problem of startability.

SUMMARY OF THE INVENTION

The fuel cells have a problem that because a fuel cell is a power generator which converts chemical energy into electric power, it takes time from when the fuel cell is started until it can supply stable power required by a load (an electronic system, for example, hereinafter referred to as "load system".

The object of the present invention is to provide a power supply which, when viewed as a whole, can stably supply electric power that the load requires even for a period of time when the fuel cell by itself cannot generate electric power required by the load.

According to the present invention, there is provided a power supply unit having a fuel cell and a power storage unit, wherein electric power is supplied to the load from the power storage unit and the fuel cell in parallel.

The power supply as a whole can stably supply electric power required by the load even for a period of time when the fuel cell by itself cannot generate electric power required by the load.

Other objects, features and advantages of the invention will become apparent from the following description of the embodiments of the invention taken in conjunction with the accompanying drawings.

BRIEF DESCRIPTION OF THE DRAWINGS

FIG. 18 is a graph showing an output change characteristic of the fuel cell with respect to the temperature change of the fuel cell.

DESCRIPTION OF THE EMBODIMENTS

Figure 1:
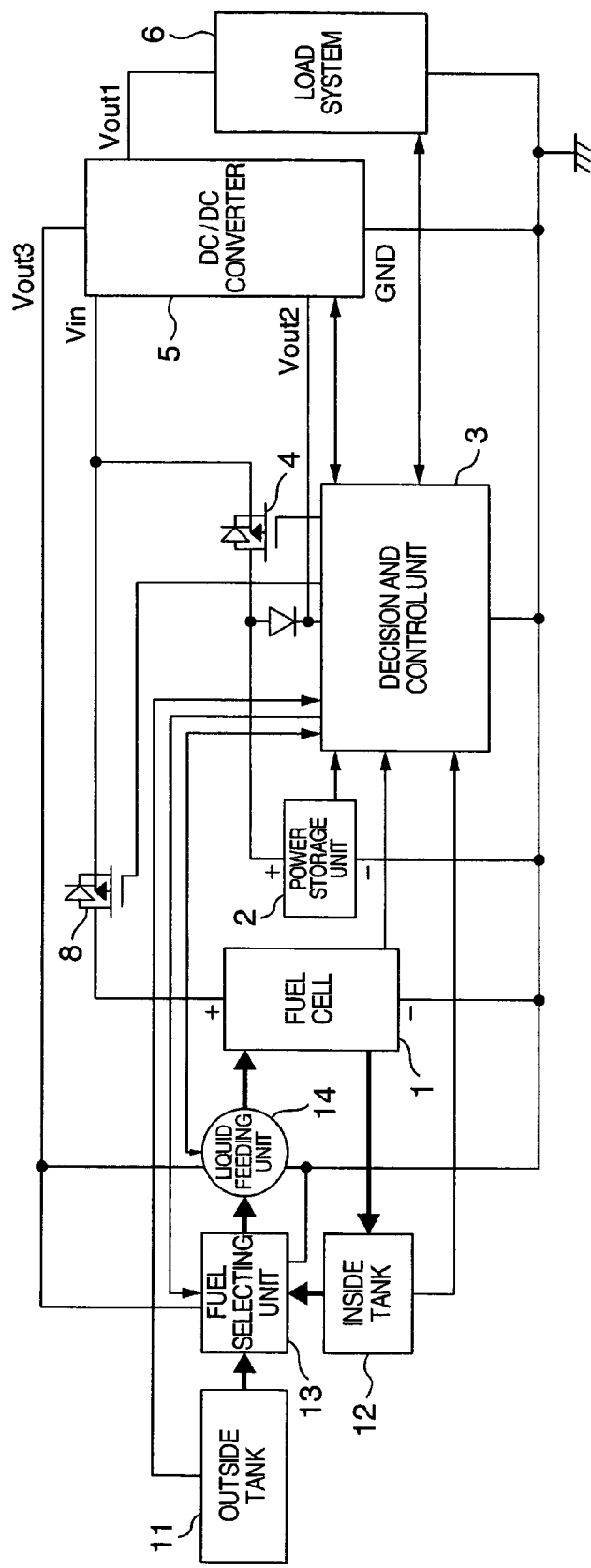
FIG. 1 is a structure according to a first embodiment of the present invention.

In embodiments of the present invention, there are provided a power supply unit and its control method in a system using a fuel cell and a power storage unit, which are capable of starting the fuel cell at high speed, monitoring output and remaining amounts of fuel and power, and taking measures against fluctuations of output, in addition to merits of downsizing the power storage unit and reducing the system price.

Embodiments of the power supply unit and control method therefor according to the present invention will be described with reference to the accompanying drawings wherein like reference characters designate like parts.

First Embodiment

A first embodiment of the present invention is described with reference to FIG. 1. FIG. 1 is a block diagram schematically showing a structure of the power supply unit and connections of power lines and signal lines.

In the structure of this embodiment, there are provided two power supplies, that is, a fuel cell 1 and a power storage unit 2, a blocking diode for backflow prevention and a discharge switch 8 on the fuel cell 1 side, and a discharging diode and a charging switch 4 for controlling charging ON/OFF on the power storage unit side. In FIG. 1 the diode and charging switch 4 are connected to the positive side of the power storage unit 2, but they may be connected to the negative side of the power storage unit 2. For this purpose, a switching element, such as a P-channel MOF FET or an N-channel MOS FET, may be used, which provides a better efficiency in conducting a large current than in the case where only the diode is used.

The switching element is controlled by a decision and control unit 3 or it may be connected so that it automatically turns ON or OFF according to a detected voltage value of the fuel cell.

In a fuel cell 1 utilizing methanol as fuel according to the first embodiment, electricity is generated by direct conversion to electric energy from chemical energy of methanol by an electrochemical reaction which will be described below.

On the anode side, an aqueous solution of methanol, which is supplied, is dissociated into carbon dioxide gas and hydrogen ions by a reaction that occurs according to an equation (1).

$$CH_3OH+H_2O \rightarrow CO_2+6H^++6e^- \quad (1)$$

The generated hydrogen ions move through an electrolyte film from the anode to the cathode side and, on the cathode electrode, reacts with an oxygen gas that comes from the air as it diffuses and also reacts with electrons on the electrode according to an equation (2), thus producing water.

$$6H^++3/2O_2+6e^- \rightarrow 3H_2O \quad (2)$$

Therefore, the total chemical reactions involved in power generation occur such that methanol is oxidized by oxygen to produce carbon dioxide gas and water as shown in an equation (3) and this chemical reaction equation is the same as that for flame combustion of methanol.

$$CH_3OH+3/2O_2 \rightarrow CO_2+3H_2O \quad (3)$$

The open-circuit voltage of a unit cell is generally 1.2V, but practically 0.85~1.0V owing to the permeation of fuel through the electrolyte film, and a voltage under a practical load is elected in a range of about 0.2~0.6V, though not limited thereto. Consequently, when unit cells are practically used for power supply, they are connected in series to obtain a specified voltage that the system as a load requires. Although the output current density of a unit cell differs with electrode catalysts, electrode structures, and so on, a unit cell is so designed as to effectively obtain a specified current by selecting the area of the power generating section of the unit cell. Moreover, the battery capacity can be adjusted by connecting unit cells in parallel where necessary. In this embodiment, the rated voltage of a unit cell is set at 0.3V.

Since the fuel cell is a power generator that generates electric power by an oxidation-reduction reaction, it takes time from when the fuel reaches the electrode until stable electric power is practically obtained.

Because the fuel cell is a power generator as described above, fuel is indispensable for power generation. However, if fuel remains kept at the fuel electrode, a phenomenon called crossover takes place such that the fuel passes through the film; therefore, it follows that even when the fuel cell is not being used, the fuel is consumed.

In order to completely eliminate fuel consumption when the load system is not used as in self-discharge of ordinary battery cells, it is only necessary to supply fuel to the fuel cell only when it is used, in which case, however, electric power is required to feed fuel to the fuel cell when its use is started.

Next, the characteristic of the fuel cell after fuel is fed to the fuel cell is that the temperature dependence of output is very high, in other words, output is very low especially at low temperatures. Therefore, the rated output warranted for the fuel cell is obtained only in such designs for use at a certain temperature (40° for example) or higher. For this reason, in designing a fuel cell for use in portable apparatuses, it is necessary to devise some measures to raise its temperature as quickly as possible, but a problem here is that until the fuel cell reaches the above-mentioned set temperature, electric power necessary for the load system is insufficient.

In fuel cells, in proportion to current produced, carbon dioxide is discharged from the fuel electrode, and water is discharged from the air electrode, so that those reaction products sometimes clog the outlet, resulting in a decrease in voltage. In such a case, if electric power is taken from the fuel cell, the situation further worsens in such a way that an excessive current flows out of the fuel cell, thereby even further increasing the amount of reaction products. Therefore, it is necessary to make some arrangement not to take excessive output from the fuel cell.

Those that can be used as the power storage unit 2 include capacitors, such an electric double layer capacitor, or secondary cells, such as an Ni secondary cell, or a Li secondary cell whose category includes a Lithium polymer cell and an ordinary Lithium ion cell.

However, when the required power for the load system is supplied by an ordinary Li secondary cell capable of discharging up to 2 C in order to realize the control method according to this embodiment, which will be described later, there may be a case where a cell capacity larger than the required energy capacity in a practical situation needs to be mounted. In such a case, it is desirable to mount, for a possibility of down-sizing, a lithium ion cell, Ni secondary cell, proton polymer cell, or electric double layer capacitor, often used in HEV or EV, which are, though inferior in energy density, capable of charging and discharging at a high rate current.

In this configuration, the lower-limit voltage of the fuel cell 1 when the maximum electric power is supplied to a load system 6 is set at not lower than the upper-limit of the storage unit. When 4.3~3.6V is set as the upper-limit voltage of a lithium cell, in consideration of that the unit-cell voltage of the fuel cell is about 0.8~0.3V at the maximum-output design point due to voltage drop from the maximum unit-cell voltage of about 1.2~0.8V of the fuel cell, an appropriate number of series staked cells of the fuel cell per unit lithium cell is in the range from 5 to 16.

By the way, different kinds of power storage units can be used in such a manner to match a setting voltage. In the case where the upper-limit voltage is set at 4.0~2.3V using a single cell of an electric double layer capacitor, the number of unit cells of the fuel cell is preferably in the range from 3 to 20. In another case where the upper-limit voltage is set at 1.4~1.0V using a single cell of an Ni secondary cell or proton polymer cell, the appropriate number of unit cells of the fuel cell is in the range from 2 to 6. If the power storage units 2 are connected in series, it is only necessary to use the number of cells of the fuel cell times the number of power storage units in series.

As has been described, by selecting upper-limit voltage levels of the fuel cell 1 and the power storage unit 2 in the above-mentioned range by taking the output characteristics of the fuel cell 1 into consideration, it is possible to optimize the size, cost and generation efficiency of a fuel power generation system.

Electric power is supplied at a voltage adaptable to the load system 6 by changing electric power from the above-described two kinds of power sources by using a DC-DC converter 5. As the DC-DC converter 5, a voltage step-up converter of the insulation type or chopper type is effective in reducing the number of battery cells, but a voltage step-down converter or a multi-output converter may be used according to the type of the load system 6.

Figure 2:
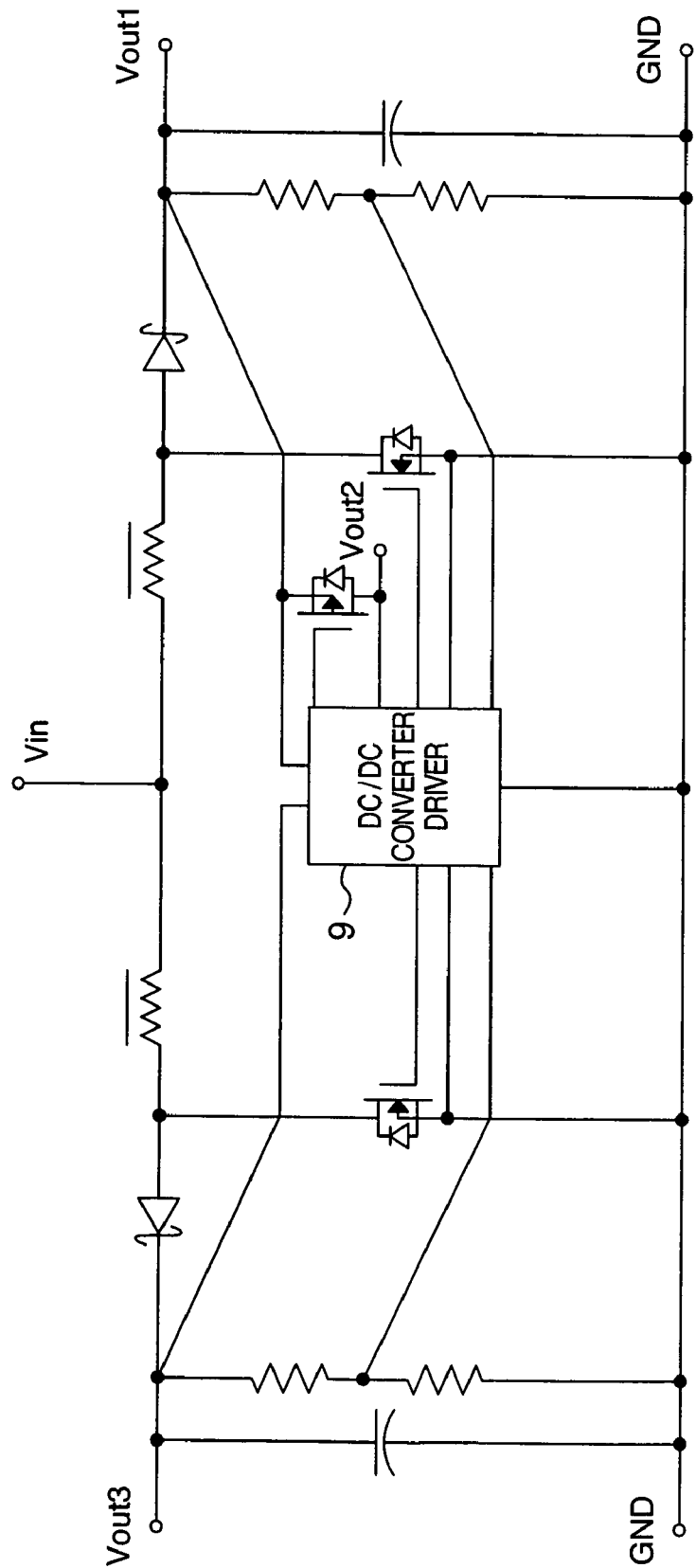
FIG. 2 is a circuit structure of a DC-DC converter according to the first embodiment of the present invention.

A soft-start function may be added according to the load system 6. An example of the circuit of the DC-DC converter 5 is shown in FIG. 2.

The DC-DC converter is so structured as to receive power from the input Vin and supply different voltages to the output Vout 1 for the load system 6, the output Vout 2 for the decision and control unit 3, and the output Vout 3 for auxiliary devices (a fuel selecting unit 13, a liquid feeding unit 14) of the fuel cell. The Vout 1 and the Vout 3 are of a voltage step-up chopper type and the Vout 2 is of a voltage step-down linear regulator type. When a voltage step-down regulator is built in a DC-DC converter driver 9, this regulator may be used for the Vout 2 to regulate an output voltage.

The load system 6 applicable to this embodiment includes portable devices, such as a notebook-size computer, a PDA, a portable phone, a DVD player, an MP3 player, and a vacuum cleaner, an iron, cordless devices such as a camping power source, and an in-vehicle battery.

Next, the fuel cell is described in the following.

As the fuel storage, two kinds of storage are provided: an outside fuel tank 11 and an inside fuel tank 12. The outside tank 11 can be detached and attached by the user, and is provided with a remaining amount detecting unit to detect a remaining amount of fuel by measuring a resistance value or a capacitance value which changes with the remaining quantity of fuel. The inside tank 12 is a fixed, undetachable tank, which is smaller in size than the outside fuel tank 11 and which is built in the fuel cell system, and which stores fuel that has passed through the fuel cell and can discharge carbon dioxide gas from the reaction to the outside by a gas-liquid separation membrane or a valve. The inside tank is also provided with a remaining amount detecting unit.

A fuel selecting unit 13 can switch over the flow paths of the outside fuel tank 11 and the inside fuel tank 12 to select one of the both-usable state, one-usable state, and none-usable state. By setting the both-usable state, the fuel selecting unit 13 can be used as a fuel density adjusting means.

For use as the fuel selecting unit, a step motor and a magnet valve can be cited as specific examples. The liquid feeding unit 14 is a means for supplying a fuel from a flow path, to which the direction of flow is switched by the fuel selecting unit 13, to the fuel cell 1, and for this purpose, a diaphragm pump, piston pump or the like is used.

The drive electric power to those devices is supplied from the power storage unit 2, the fuel cell 2, or the DC-DC converter 5. In a mounting mode of the fuel-cell 1, not graphically shown, as the air blower unit to the air electrode side of the fuel cell, an air pump or a fan may be added, which is indispensable particularly for multilayer fuel cells.

Description now moves on to the control unit and method.

As the decision and control unit 3, a one-chip microcomputer or a comparator is used for example. The drive electric power to the decision and control unit 3 is supplied from the power storage means 2, the fuel cell 1 or the DC-DC converter 5. As an input signal to the decision and control unit 3, the decision and control unit 3 receives fuel remaining amount information from the outside fuel tank 11 and the inside fuel tank 12, state information from the liquid feeding unit 14, state information from the power storage unit 2, state information from the fuel cell 1, state information from the DC-DC converter 5, and a control signal from the system 6.

As output signals from the decision and control unit 3, the decision and control unit 3 sends a control signal to the fuel selecting unit 13, a control signal to the liquid feeding unit 14, a control signal to the charging switch 4, a control signal to the DC-DC converter, and a control signal to the system 6. Particularly when the decision and control unit 3 is a microcomputer, it should preferably be provided, besides ordinary input and output terminals, with transmission terminals (serial, 12c, SMBus, for example) for transmitting remaining-amount information, terminals for A-D converter for deciding voltage, interrupt (INT) terminal for interruption for a start signal, etc.), and a timer function.

In this embodiment, there is provided a structure which has a primary cell, a secondary cell, and a power storage unit, such as a capacitor. However, it is desirable that the above-mentioned power storage unit is as small as possible to realize a small-size and light-weight of power supply. Therefore, it is required to provide a structure and control method applicable on a small-capacity power storage unit.

Description will then be made of details of a control method using this configuration.

In this control method, there are 9 modes, which will be described below.

The first mode is a start mode in which a startup decision is made as to whether the power supply unit is initiated from its stopped state, causing the power storage unit thereof to start to supply power to the system 6 and comes up to a point where the fuel cell 1 becomes ready to generate a rated output.

The second mode is a steady-state mode in which various signals and changes of state are continuously monitored and decided under the state in which the fuel cell 1 and the system are being driven.

The third mode is an abnormality mode for supporting the fuel cell 1 when it suffers from a voltage drop at the time of abnormality of the fuel cell 1 after the first mode and for deciding output recovery.

The fourth mode is a steady-state charging mode for charging the power storage unit 2 when the remaining fuel amount is large and the remaining power amount of the power storage unit 2 is small.

The fifth mode is a high load prohibition mode for charging the power storage unit 2 while prohibiting a high load when the remaining fuel amount is small and the remaining power amount of the power storage unit 2 is small.

The sixth mode is a fuel zero (0) mode in which the drive of the system 6 is stopped when the fuel is 0.

The seventh mode is a fuel cell stop mode in which a stop process of the fuel cell 1 is executed after the sixth mode or after a shutdown process by the user.

The eighth mode is an in-stoppage monitoring mode in which various signals and changes of state are monitored and decided continuously when the system 6 and the fuel cell 1 are in a stopped condition, namely, when they are not operating.

The ninth mode is an in-stoppage charging mode in which the fuel cell 1 is started so as to charge the power storage unit 2 when the user leaves the fuel cell 1 unattended for a long time and the fuel cell is discharged to a certain extent or more by self-discharge or the like.

Figure 3:
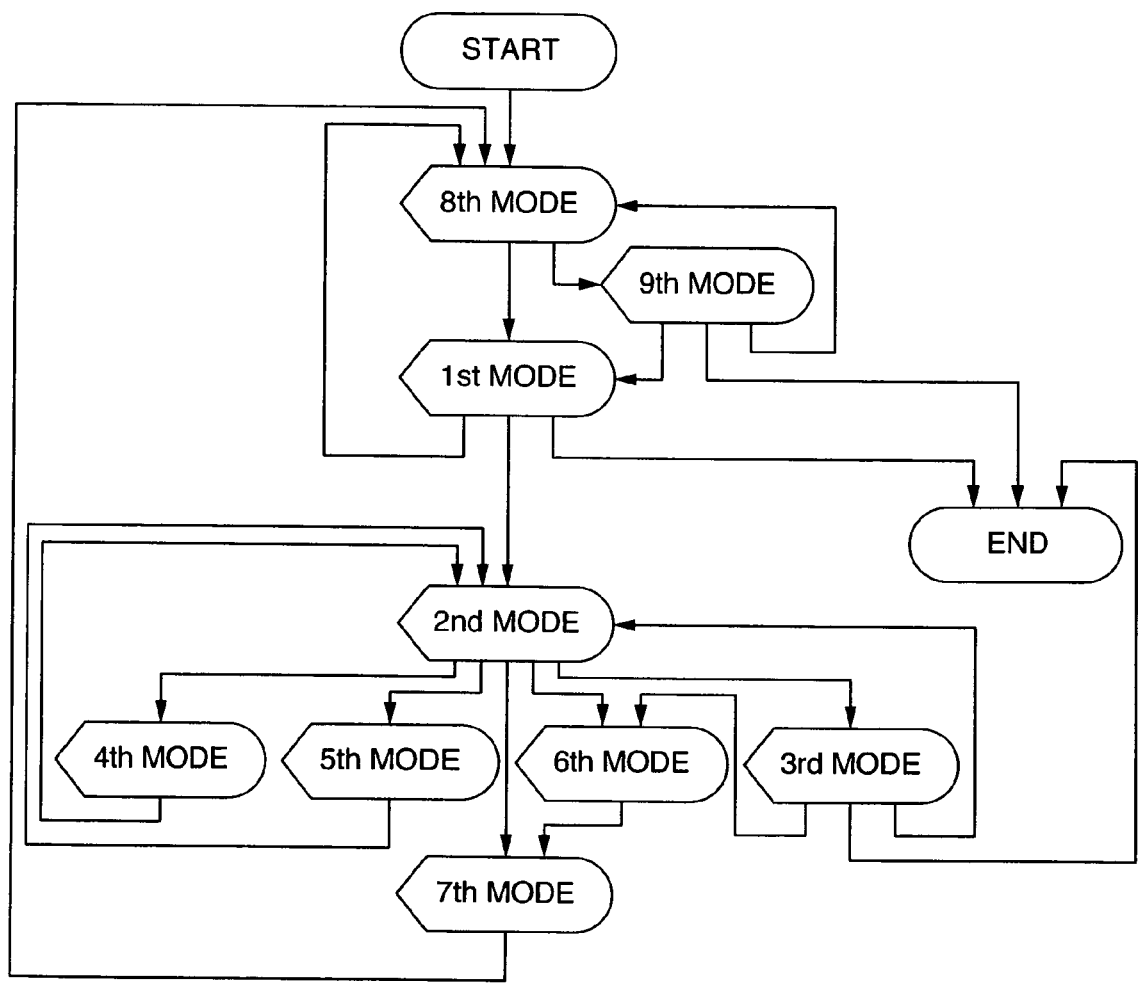
FIG. 3 is a general flowchart in the present invention.

FIG. 3 is a flowchart showing the interrelations among the nine modes. Details of each mode will be described with reference to the accompanying drawings.

The first mode starts under the condition that fuel is not supplied to the fuel cell and output of the fuel cell is almost 0 and therefore the power storage unit and the fuel cell are electrically isolated from each other.

In the case where fuel supply to the fuel cell is not stopped, needless to say, the process starts from a second start period to be described later.

Figure 5:
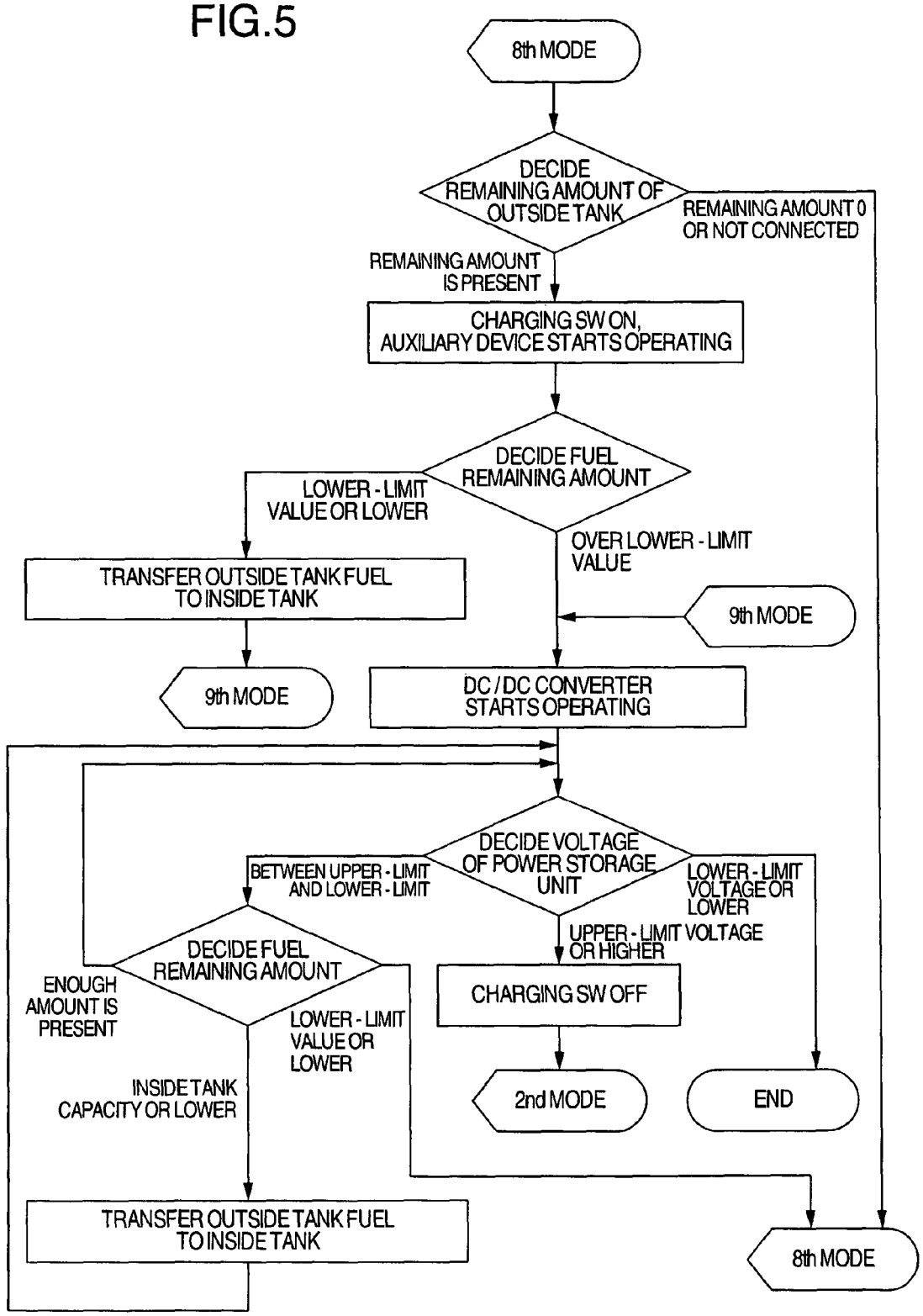
FIG. 5 is a flowchart of the first mode of the present invention.

The first mode is started in response to when the decision and control unit 3 detects a system startup signal issued by the user's operation in the eighth mode or the ninth mode. FIG. 5 shows a flowchart of the first mode. When a transition occurs from the eighth mode to the first mode, a first start-up decision is made.

When there is only an insufficient amount of fuel in the outside fuel tank 11 (including when the remaining amount is 0) or when the outside fuel tank 11 is not connected, a decision is made that startup is impossible and startup is aborted. In this case, it may be arranged that an indication means (not shown) such as an LED is provided, by which the user can recognize the event. When there is sufficient fuel, the charging switch is turned ON and the auxiliary devices are started instantly. As the auxiliary devices in this case, in addition to the fuel selecting unit and the liquid feeding unit, a blower on the fuel-cell air electrode side may be used.

Next, a decision is made about a remaining amount as a sum of the outside fuel tank 11 and the inside fuel tank 12. When the quantity of the inside tank is less than a lower-limit value, all the fuel in the outside fuel tank 11 is transferred to the inside tank 12, the process moves on to the ninth mode. If the quantity of the inside tank is not less than the above-mentioned lower-limit value, the operation of the DC-DC converter 5 starts to be driven so as to start supplying power to the system 6. Voltages involved at this time are such that the power storage unit (Li output)>the fuel cell (DMFC output) as shown in FIG. 4 and therefore electric power to the to-be-driven system 6 is all supplied from the power storage unit 2.

Figure 4:
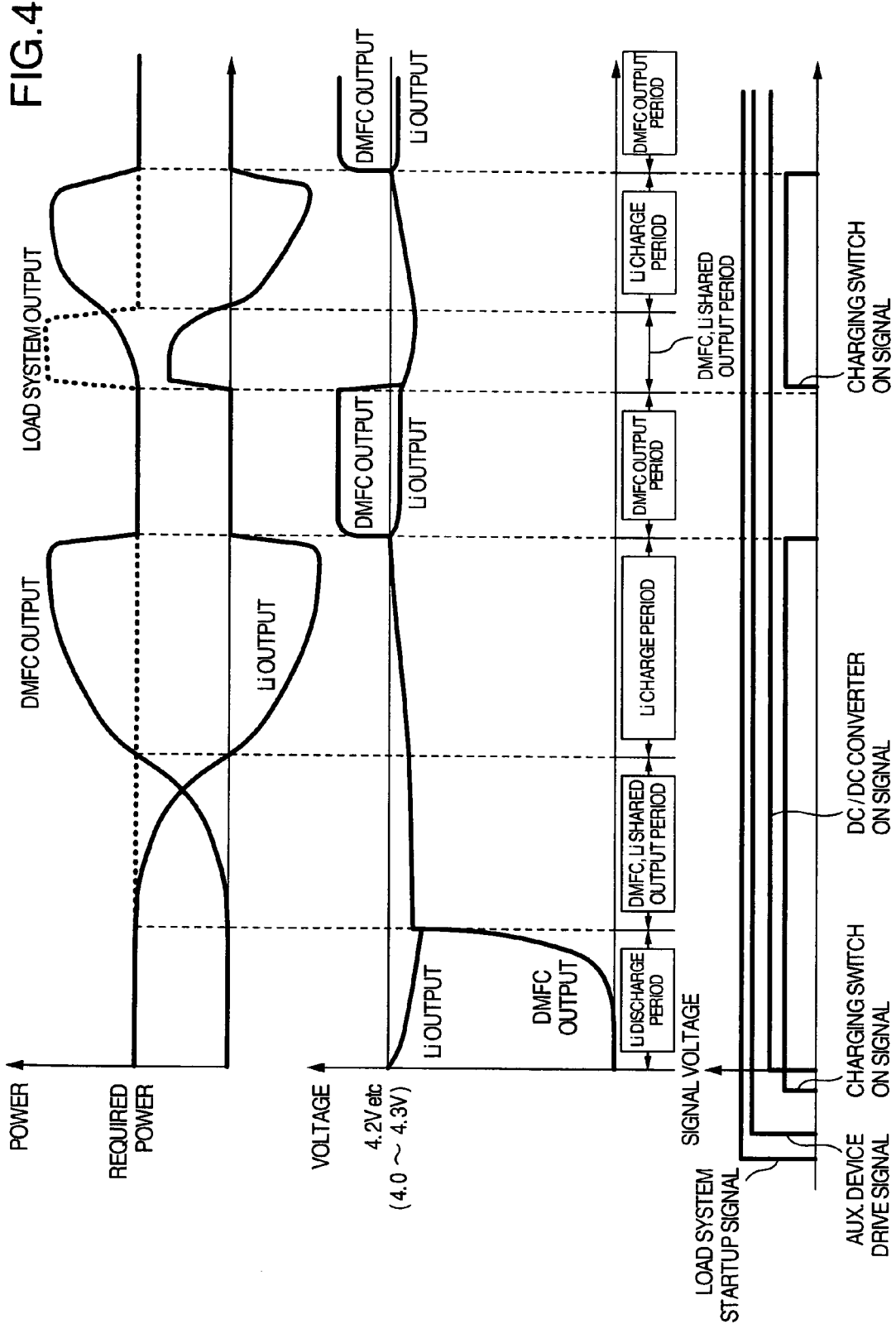
FIG. 4 is a diagram for explaining a relation among electric power and voltage and various signals in the first, second and third modes in the present invention.

The second start period is a period when the following relation holds: the voltage value of the power storage unit≈the voltage value of the fuel cell as shown in FIG. 4. In this period, the share mode becomes operational in which power is supplied to the to-be-driven system 6 from both the fuel cell 1 and the power storage unit 2 and at this time a second start-up decision is made. When operating normally, the power from the fuel cell 1 gradually increases and the power share proportion of the fuel cell 1 becomes larger than that of the power storage unit 2, thus enabling the transition to the next start period to occur all right. However, if power does not increase due to some abnormal state, such as a failure in the fuel cell 1 and the power share proportion of the power storage unit 2 stays at a high level and the decision and control unit 3 decides that the startup was failed when the A/D port or the like of the decision and control unit 3 detects that the voltage at the input side of the DC-DC converter 5, in other words, the voltage of the power storage unit 2, has dropped from a set value. Then, the decision and control unit 3 transmits a shutdown signal to the to-be-driven system 6 to cause the system 6 to shut down, and confirms the shutdown based on load information from the DC-DC converter 5 and stops the DC-DC converter 5 and informs the user of the state of failure by an indicating means (not shown), such as an LED. Moreover, when the sum of the remaining fuel amounts of the outside fuel tank 11 and the inside fuel tank 12 is not higher than the lower-limit value, the process proceeds to the eighth mode.

The third start period is a period when the voltage of the fuel cell is higher than the voltage of the power storage unit at the current of the power storage unit being 0, in other words, the voltage of power storage unit (current 0)<the voltage of fuel cell. Change-over from the second start period to the third start period is not at a well defined point; as a matter of fact, a reverse change-over from the third start period to the second start period can occur in a changeover area depending on an increase or decrease of the required load of the to-be-fed system 6. As electric power is supplied from the fuel cell 1 to the system 6, charging of the power storage unit 2 takes place, too. Consequently, the voltage of the power storage unit 2 rises as the voltage of the fuel cell 1 rises. Here, the third start-up decision, namely, the final start-up decision is performed. The decision and control unit 3 detects that the set upper-limit voltage (4.2~4.3V) has been reached by detecting the voltage of the power storage unit 2 at the A/D port, for example, and turns OFF the charging switch 4 to thereby finish the charging of the power storage unit 2. Because the charging power to the power storage unit 2 comes to 0, the voltage of the fuel cell 1 rises correspondingly and shifts to a steady state of a good fuel utilization rate, by which the operation of the fuel cell 1 is finished. Note that because the discharge side of the power storage unit 2 is connected to the diode, when the voltage of the fuel cell plunges, it can be supported instantaneously.

Figure 13:
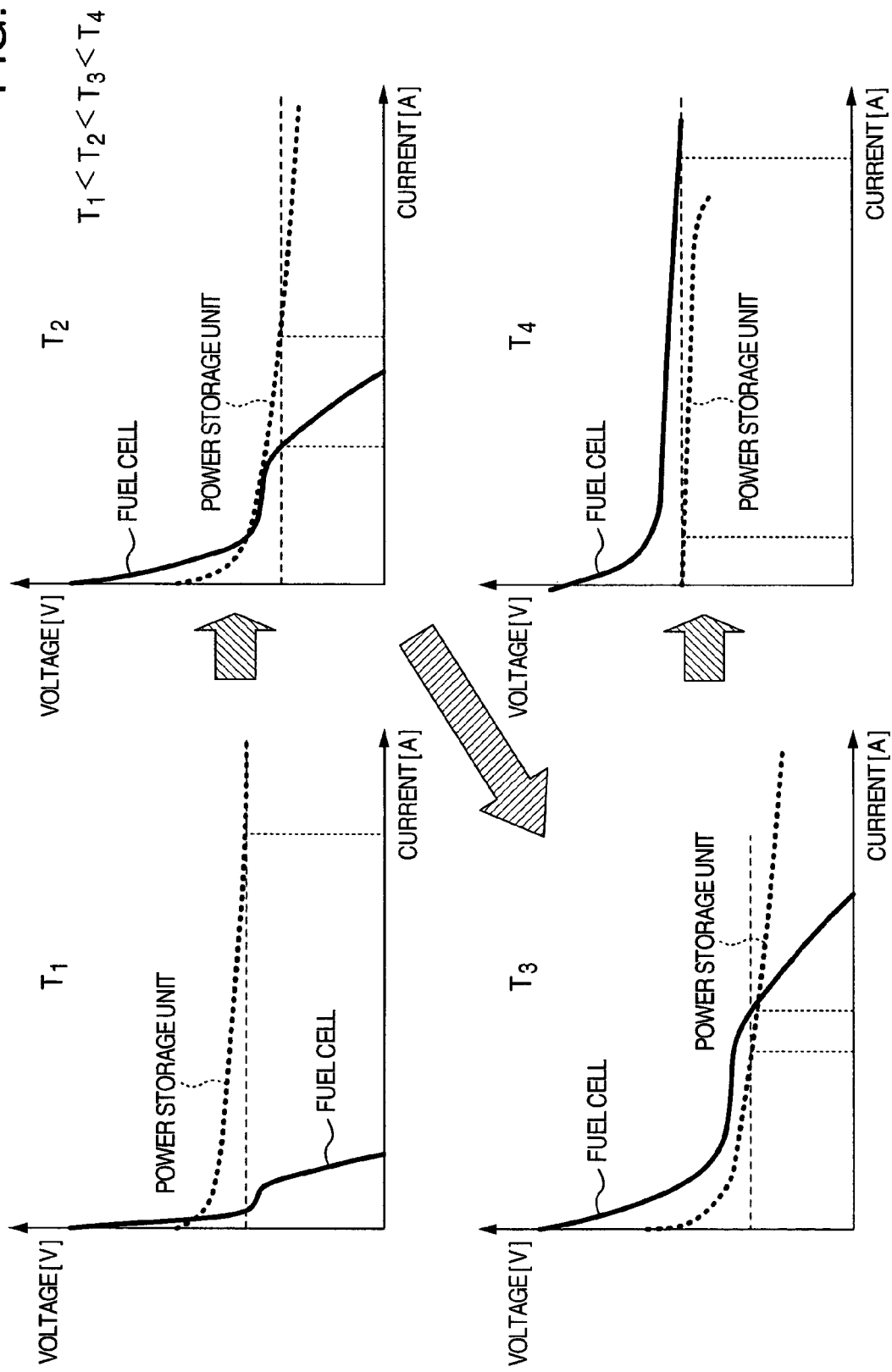
FIG. 13 is a diagram for explaining a relation of the current and voltage of the fuel cell and the power storage unit in the first mode of the present invention.

FIG. 13 shows changes in the characteristics at that time. As shown in the figure, the fuel cell cannot output up to a specified current at low temperatures like T1. However, by arranging for electric power to be output in parallel with the power storage unit, the fuel cell can be raised in temperature by heat generation by a power generation reaction of the fuel cell and also by heat generation by an internal resistance of the fuel cell, and a larger current can be output as the temperature rises as T1→T2→T3→T4. FIG. 18 shows an output change characteristic by temperature changes of the fuel cell 1. The fuel cell 1 may be designed such that it changes in the voltage and current ranges as shown in the figure and after the fuel cell is started, it can supply power in a range of a good fuel utilization rate.

In this embodiment, description has been made centering on a lithium battery cell as a power storage using 2, but even in cases where other secondary cells and capacitors, such as an electric double layer capacitor, are used, they can be readily applied merely by changing the set upper-limit voltage.

By executing the start modes described above, it becomes possible to provide a simple start-up decision system for the fuel cell, with features that the user' fuel cell start waiting time is 0, stable output is possible in an output unstable period during starting-up of the fuel cell, and many sensors are not required. While it is desired that the power storage unit of a smallest possible size be used in systems of potable devices, the use of such a small power storage unit poses the problem that as output time becomes long, a voltage drop of the power storage unit caused by discharging makes it difficult to provide stable output. This problem can also be overcome such that, instead of keeping only the power storage unit supplying power to the load system and auxiliary devices of the fuel cell until the fuel cell becomes completely ready to output power, it becomes possible to reduce losses due to internal resistance and thereby further decrease the capacity of the power storage unit by bringing the fuel cell in a state of outputting in parallel with the output of the power storage unit, even if the fuel cell is in an incomplete state in which it is incapable of supplying a rated output. If the power storage unit is a lithium battery cell, in this method, charging is performed in a constant-current charging range, and therefore charging can be done to fill the amount of need and charging time can be reduced. Because the fuel cell is brought into a state of overload exceeding a steady-state power range of the fuel cell, the start-up time of the fuel cell can be improved.

Figure 6:
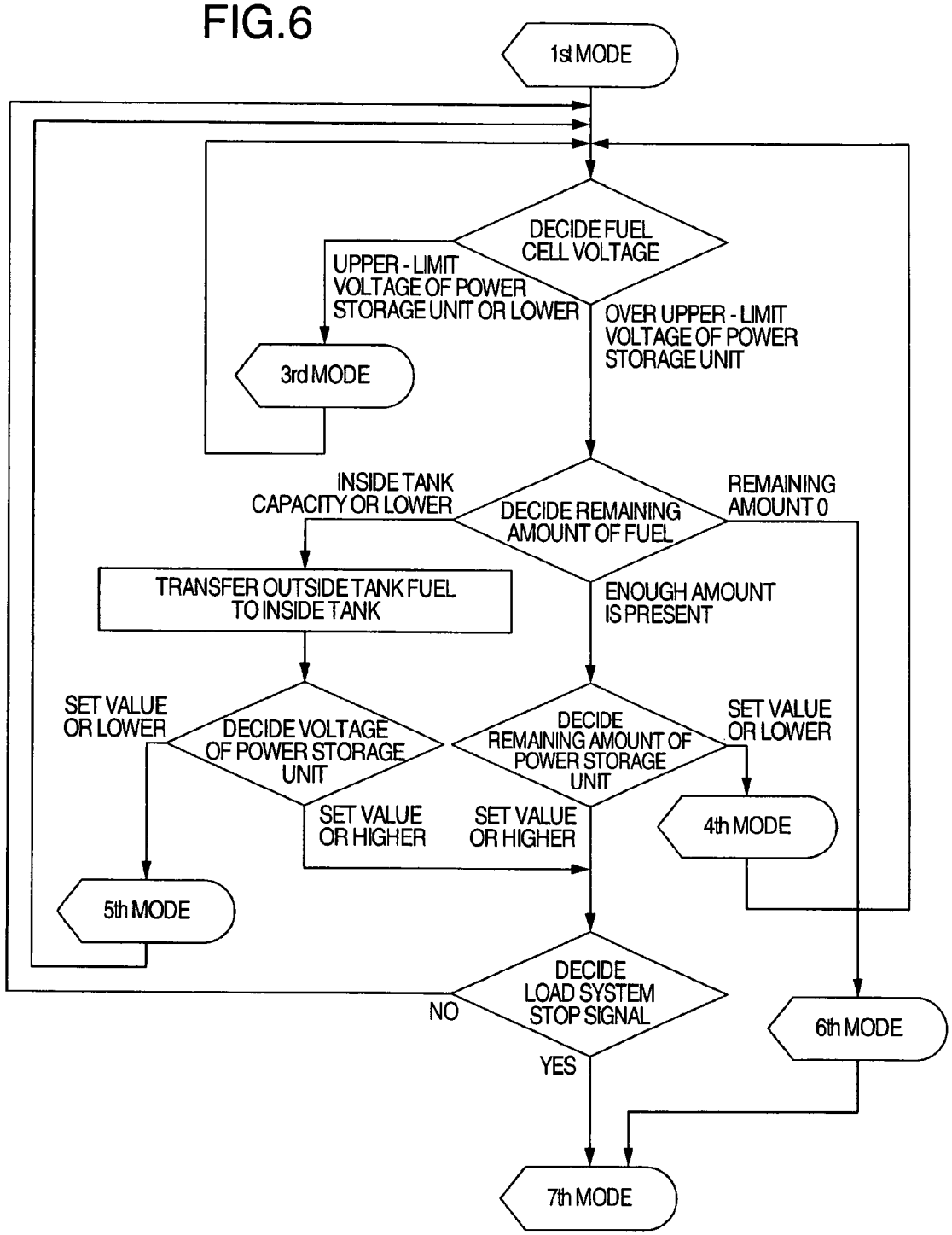
FIG. 6 is a flowchart of the second mode of the present invention.

FIG. 6 shows a flowchart of the second mode. The decision and control unit 3 monitors the fuel cell voltage, power storage unit voltage, remaining fuel amounts (both remaining amounts of the outside tank and the inside tank), and an load system stop signal from the terminal of the load system, indicating that the user performed a load system shutdown operation, and a transition takes place to various modes as occasion demands.

Figure 7:
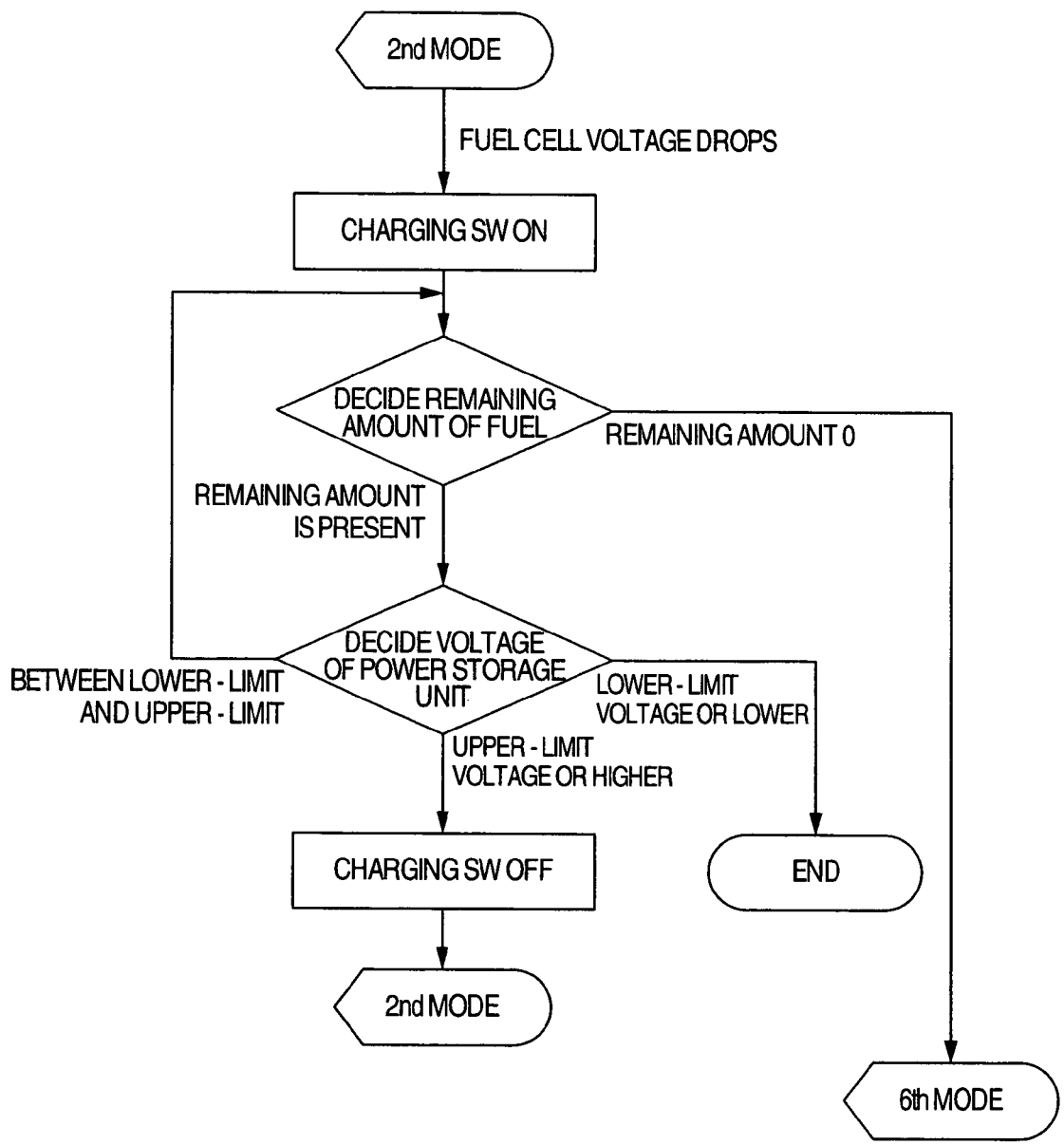
FIG. 7 is a flowchart of the third mode of the present invention.

The transition to the third mode occurs when a voltage detecting unit detects that the voltage of the fuel cell dropped for some reason or other in the second mode. One cause for this transition was found by observing that at least one of carbon dioxide and water produced by the reaction obstructed the supply of water, methanol and oxygen required for reaction to MEA. FIG. 7 is a flowchart of the third mode. FIG. 4 shows changes in electric power and voltage in this mode. First, the charging switch is turned on to make the power supply unit ready for charging and discharging. If the output of the fuel cell 1 recovers and it becomes possible both to supply power to the load system 6 and to charge the power storage unit 2, a decision is made that the abnormal state has ended in response to that the voltage of the power storage unit 2 rises up to the upper-limit voltage or higher, and the process goes back to the second mode by turning OFF the charging switch. If the output of the fuel cell 1 remains in an abnormal state, a decision is made that the fuel cell is out of order by detecting that the fuel cell output voltage is reduced to the lower-limit voltage or less of the power storage unit, and the process is terminated. In the course of the third mode, if the total of remaining amounts of the outside fuel tank 11 and the inside fuel tank 12 becomes 0, a transition occurs from the third mode to the sixth mode.

Figure 8:
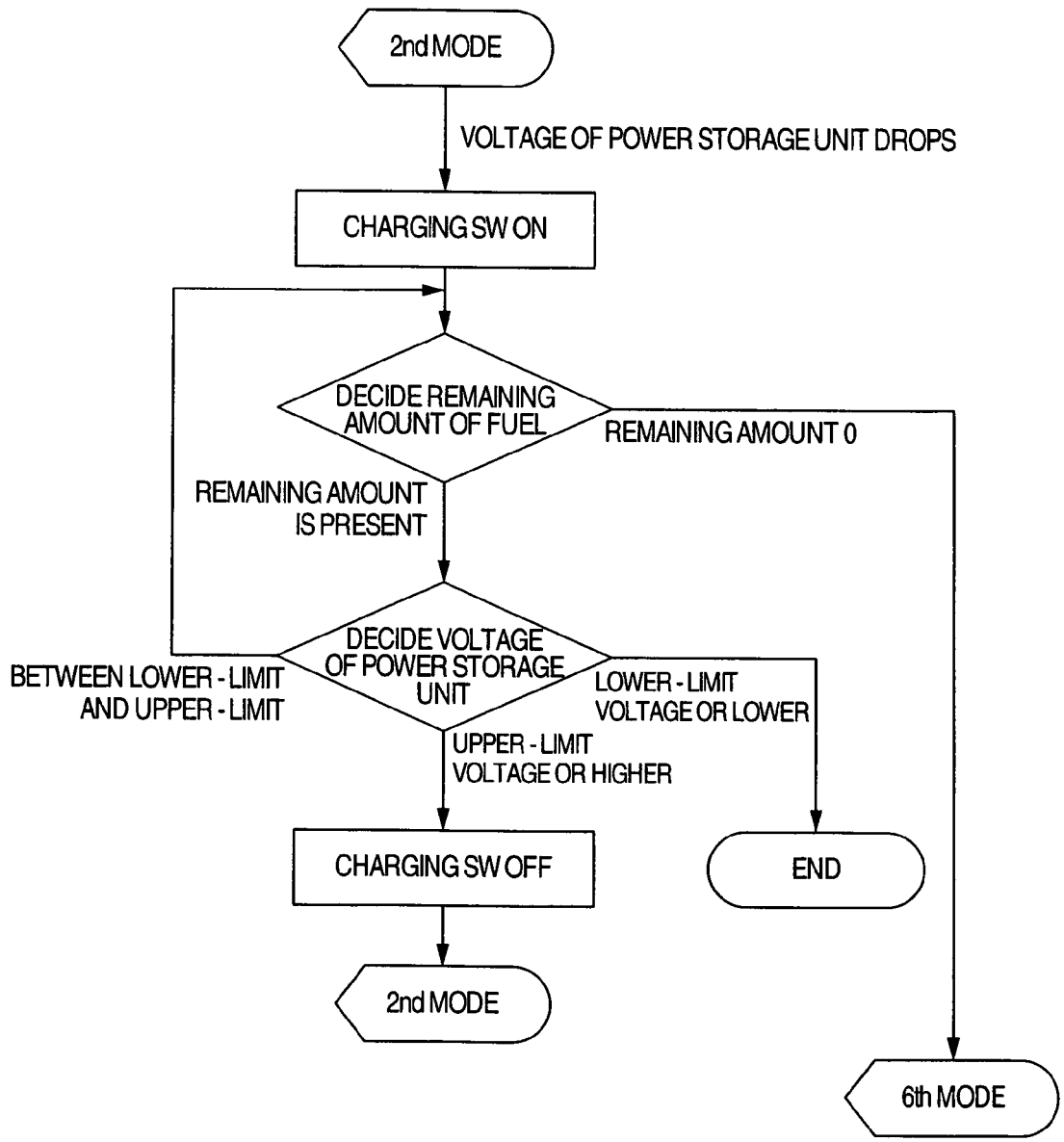
FIG. 8 is a flowchart of the fourth mode of the present invention.

FIG. 8 is a flowchart of the fourth mode. A transition to the fourth mode occurs when it is detected that the voltage of the power storage unit fell below a set value of emergency charge voltage at which emergency charge is considered to be required and that the total of remaining fuel amounts of the outside fuel tank 11 and the inside fuel tank 12 is larger than a set value. First, by turning the charging switch 4 ON, the power supply unit is made ready for charging and discharging. When normally operating, a decision is made that the abnormal state has ended in response to that the voltage of the power storage unit 2 rises no less than an upper-limit voltage, and by turning OFF the charging switch 4, the process returns to the second mode. If the output of the fuel cell 1 remains in the abnormal state, a decision is made that the fuel cell 1 is out of order by detecting that the voltage of the power storage unit 2 is reduced to or below the lower-limit voltage, and the process is finished. When the total of the remaining amounts of the outside fuel tank 11 and the inside fuel tank 12 becomes 0 in the middle of the fourth mode, a transition occurs from the fourth mode to the sixth mode.

Figure 9:
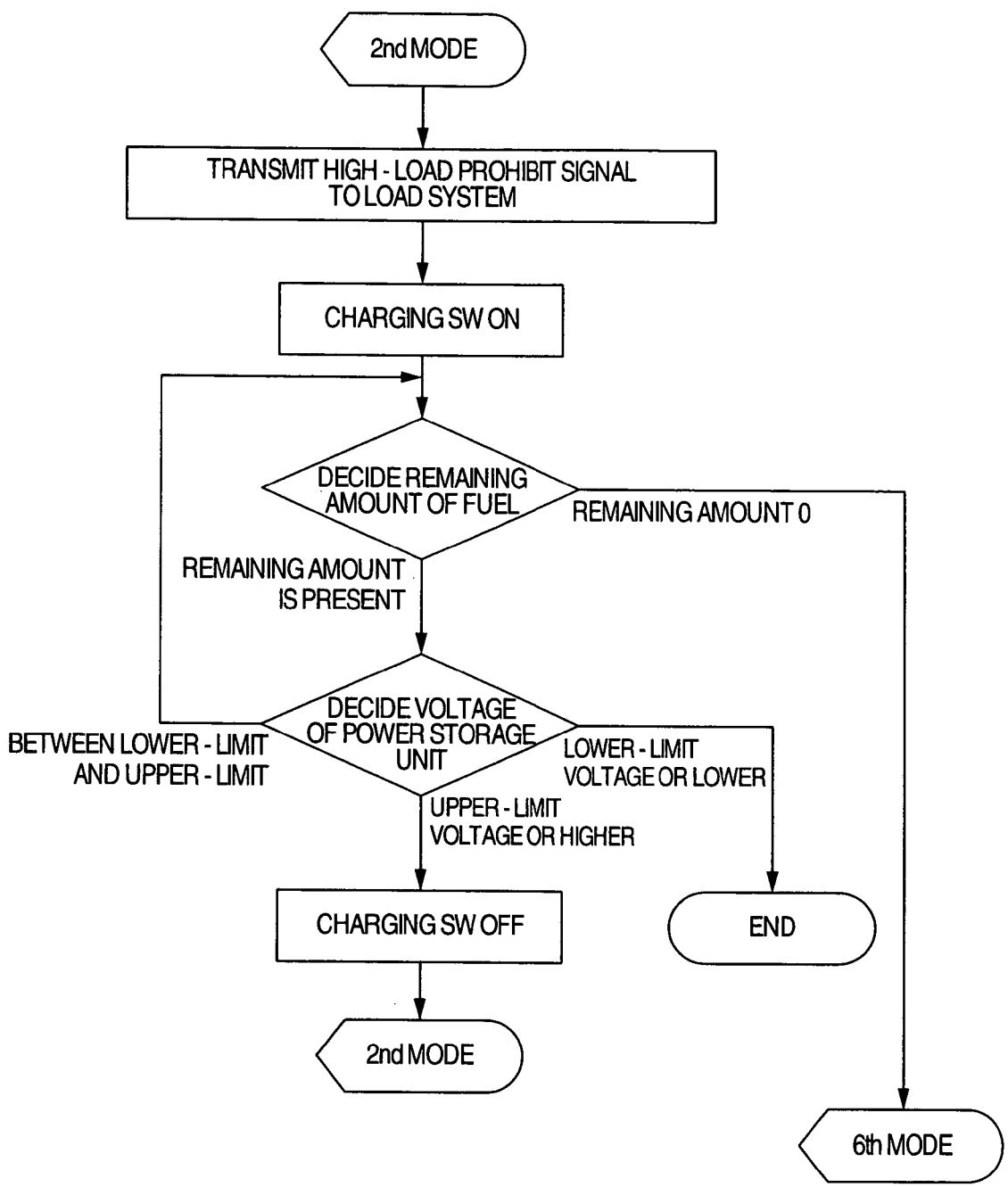
FIG. 9 is a flowchart of the fifth mode of the present invention.

FIG. 9 is a flowchart of the fifth mode. A transition to the fifth mode occurs when it is detected that the voltage of the power storage unit 2 fell below a set value of emergency charge voltage at which emergency charge is considered to be required and that the total of fuel remaining amounts of the outside fuel tank 11 and the inside fuel tank 12 is less than the quantity of the inside tank 12. Firstly, a signal to prohibit high load is sent to the load system 6 to preclude the use of high-load applications, and after this, by turning ON the charging switch 4, the power supply unit is made ready for charging and discharging. When operating normally, a decision is made that the abnormal state has ended in response to that the voltage of the fuel cell 1 rises to the upper-limit voltage or higher, and by turning OFF the charging switch 4, the process goes back to the second mode. If the output of the fuel cell 1 remains abnormal, a decision is made that the fuel cell 1 is out of order by detecting that the voltage of the power storage unit 2 fell down to the lower-limit voltage or less, and the process is finished. If the total of the remaining amounts of the outside fuel tank 11 and the inside fuel tank 12 becomes 0 in the middle of the fourth mode, a transition occurs from the fifth mode to the sixth mode.

The transition to the sixth mode occurs when an aggregate amount of the outside fuel tank 11 and the inside fuel tank 12 decreases to 0. First, a shutdown signal is sent to the load system 6 to start a forced shutdown and the seventh mode is entered. Instead of a shutdown signal, it may be arranged that OS of the load system 6 executes a forced shutdown by making the decision based on remaining amount information. In this case, when the remaining amount is 0, a direct transition occurs to the seventh mode.

The transition to the seventh mode occurs after the sixth mode or following a detection of a shutdown signal indicating that a shutdown process is performed by the user. The charging switch 4 is turned ON and the DC-DC converter 5 is turned OFF when it is detected based on output information from the DC-DC converter 5 or a signal from the load system 6 that the system 6 was shut down. After this, the fan and the pump as auxiliary devices are operated for a certain length of time and a transition occurs to the eighth mode.

The transition to the eighth mode occurs from the first mode or from the seventh mode. While the load system 6 and the fuel cell 1 are in the stopped state, the decision and control unit 3 continuously monitors the remaining amount of fuel, the remaining amount of the power storage unit and a startup signal from the load system, and based on a signal detected, executes a transition to another mode. It is desirable that a transition should be performed to a power-saving operation by the decision and control unit 3.

The transition to the ninth mode is executed in response to the result of detection of the remaining amount of the power storage unit 2 in the eighth mode or by at least one of the timer functions provided in the decision and control unit 3. Fuel is supplied to the fuel cell 1 and the fuel cell 1 is started to charge the power storage unit 2. After confirming the number of times the upper-limit voltage was reached and that the voltage of the power storage unit does not reach the lower-limit voltage from the upper-limit voltage in a specified length of time, a transition occurs to the eighth mode. If a start signal by the user is detected during this process, a transition occurs to the first mode.

All the control steps in each modes described above need not be implemented, but they have only to be installed according to necessity arising from particulars of actions in each mode.

Description will now be made of specifications for the interface with the load system 6.

Signals transmitted to the system 6 are two kinds: information on remaining fuel amount of the outside fuel tank 11 and state information of the fuel cell 1.

The remaining fuel amount information is sent as information of not less than 1 bit by using not less than 1 terminal (two or more terminals including GND) or by a communications method which uses not less than two terminals (SMBus, serial, parallel, etc.). Needless to say, a communications method using one terminal (two terminals including GND) may be used. This information may be transmitted by analog voltage values or frequencies. Further, those methods mentioned above may be combined.

As the state information of the fuel cell, there are two signals: a high-load enable/disable signal when the remaining amount of the power storage unit and the remaining amount of fuel are running short and a shutdown signal to apply a forced shutdown to the load system when a fault occurred. Instead of the high-load enable/disable signal, the remaining amount information of the power storage unit, such as voltage of the power storage unit, may be output to the terminal for the OS on the load system side to decide whether a high load is permitted or not. Besides the above signals, fuel-cell temperature by a temperature sensor mounted on the fuel cell or detected temperature by a temperature sensor installed on the power storage unit may be added when necessary. In order to make an arrangement that a fuel cell device and a conventional lithium battery pack are interchangeable, an identification signal for the fuel cell and the lithium battery pack may be added.

Signals sent from the load system are two kinds: a system startup signal by the user's operation and a system drive information signal.

The system startup signal has its state changed when the user turns ON the switch of the load system 6, and the decision and control unit 3 detects this change of state. For example, the system startup signal may also serve as a system drive information signal by adapting it such that in response to user's switch ON operation the load system 6 causes the system startup signal to switch from Low level to High level to send a notification about the initiation of startup of the load system and then the system startup signal is kept at High state while the load system 6 is operating. Therefore, even when required power decreases to almost 0 as the load system enters a standby state, for example, the decision and control unit 3 still can decide that the load system has not been shut down. When the load system 6 is a notebook-size PC, as terminals for load system drive information signal, terminals for discrimination purpose, in corresponding number of active USB ports connected to USB devices, may be used (two terminals for a 3-port device, for example). By using a communications method with two or more terminals, load information, such as the number of connected devices and the number of start applications, may be transmitted from the OS side of the load system 6. The communication terminals at this time, of course, may also be adapted to also serve as communication terminals to transmit state information of the fuel cell.

Among the signals mentioned above, for those signals which are particularly urgent (load system startup signal, shutdown signal, high-load prohibit signal, etc.), the terminals on the receiving side should desirably be interrupt terminals (INT).

Figure 14:
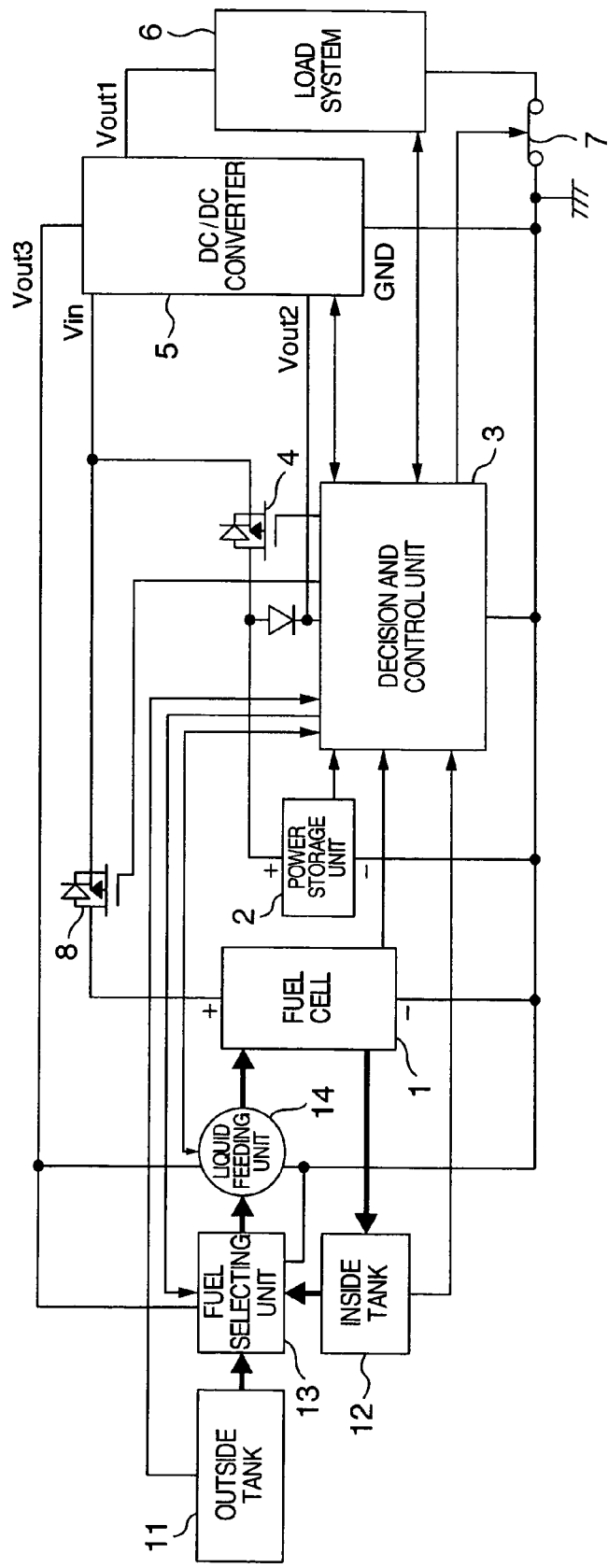
FIG. 14 is a structure in which a load isolation switch is added in the present invention.
Figure 15:
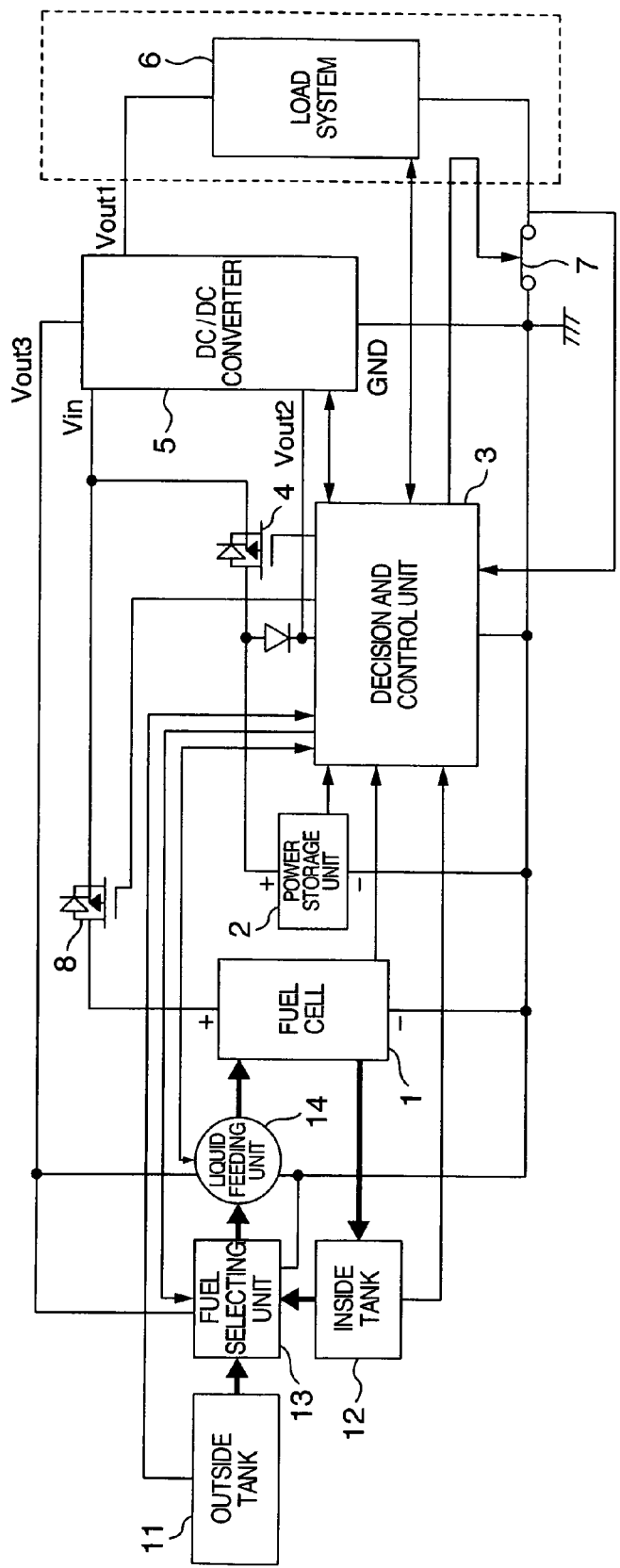
FIG. 15 is a structure in which a load isolation switch and specifications for an interface are added in the present invention.

FIG. 14 shows a structure that, in addition to the foregoing functions, a load isolation switch is provided, ON/OFF action of which is controlled by the decision and control unit based on a result of detection of connection/disconnection of the load system 6. For the load isolation switch 7, an N-channel power MOS FET may be used, or a P-channel power MOS FET may be used by mounting the latter on the positive side of the load. A load current may be detected from a voltage applied to the load isolation switch 7. In this structure, if the DC-DC converter 5 is not of isolation type, there is a fear that a short-circuit may occur at the power terminals even when they are not in use and therefore a short-circuit may be detected from a voltage applied across the load isolation switch 7. As shown in FIG. 15, terminals may be provided so that the load isolation switch 7 is turned OFF when the portion (battery pack), other than broken-line-enclosed region, is detached from the load system 6.

According to this embodiment, a small-size light-weight of the power storage unit can be realized, a fuel cell temperature can be raised quickly in addition to the provision of immediate availability of portable devices like the one using a conventional secondary cell.

Second Embodiment

Description will be made of an embodiment in the case where two outside fuel tanks 11 are used.

Figure 10:
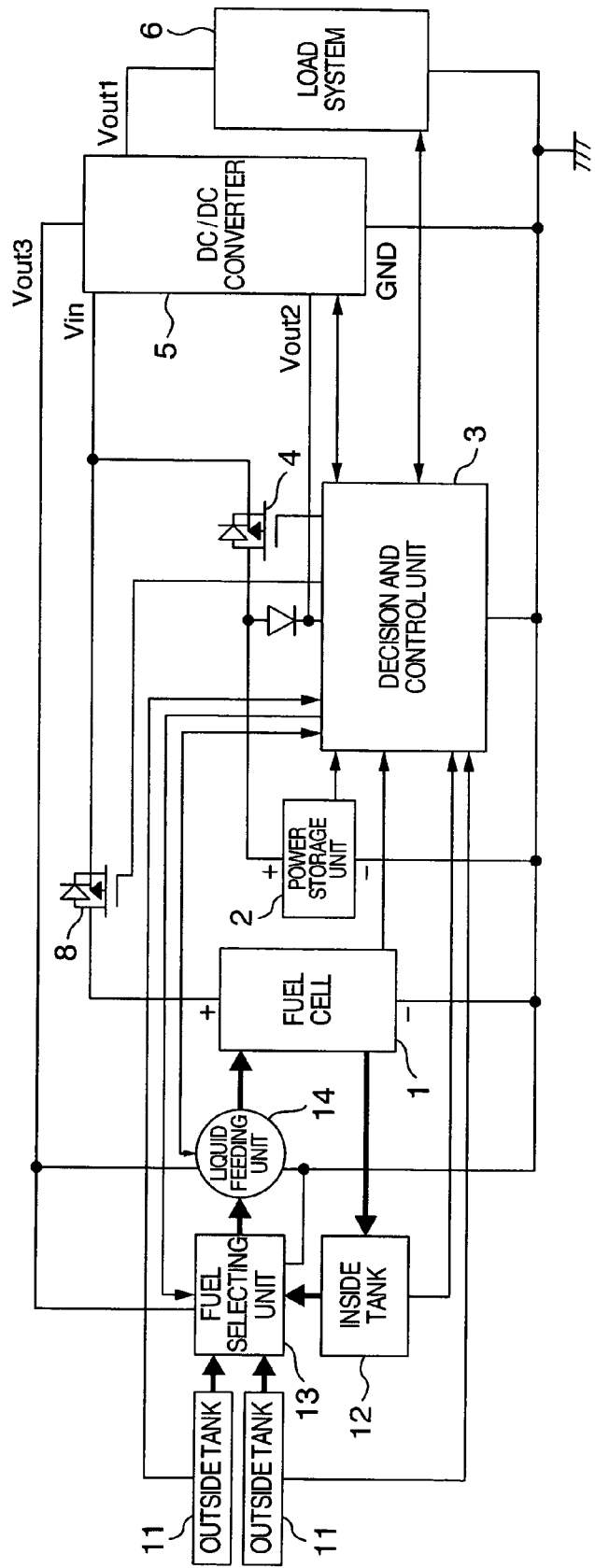
FIG. 10 is a structure in the second embodiment of the present invention.

In comparison with the first embodiment, a significant change lies in the structure of the fuel-related block. FIG. 10 shows the structure in the second embodiment. In the structure in FIG. 10, there are provided two kinds of fuel storages: two outside fuel tanks 11 and one inside fuel tank 12. The outside fuel tanks 11 are provided with a user-detachable remaining amount detecting unit for detecting a remaining amount of fuel. The inside fuel tank 12 is built in the fuel cell system and cannot be detached, is smaller than the outside fuel tanks 11, and can store fuel that has passed through the fuel cell 1.

The fuel selecting unit 13 can switch over the flow paths of the two outside fuel tanks 11 and the inside fuel tank 12 to select any one state among the two-or-more-usable state, one-usable state, and none-usable state. When using one tank, the fuel storage having the smallest remaining amount is used. Therefore, when there is some fuel remaining in the inside tank 12, the fuel in the inside tank is used, but when there is no fuel remaining in the inside tank 12, out of the two outside tanks 11, one outside tank with a smaller remaining amount is used. When one outside tank 11 has no fuel remaining or is not connected, the other outside tank 11 is used. As the fuel selecting unit 13, a step motor or a magnet value may be used. The liquid feeding unit 14 is a means that supplies the fuel cell 1 with fuel from the flow path selected by the fuel selecting unit 13, and for this purpose, a diaphragm pump, a piston pump or the like is used. The drive electric power to those devices is supplied from the power storage unit 2, the fuel cell 1, or the DC-DC converter 5.

Depending on modes of mounting of the fuel-cell 1, though not graphically shown, as the air blower unit directed to the air electrode side of the fuel cell, an air pump or a fan may be added, which is indispensable particularly for multilayer fuel cells.

The parts other than the structure are the same as in the first embodiment. However, compared with a structure of having one outside fuel tank, in the structure with two outside fuel tanks, it is possible to set a longer time until replacement of the outside fuel tanks where the remaining amount 0 was detected, which provides a merit that the probability decreases that the fuel becomes completely 0.

Third Embodiment

Figure 11:
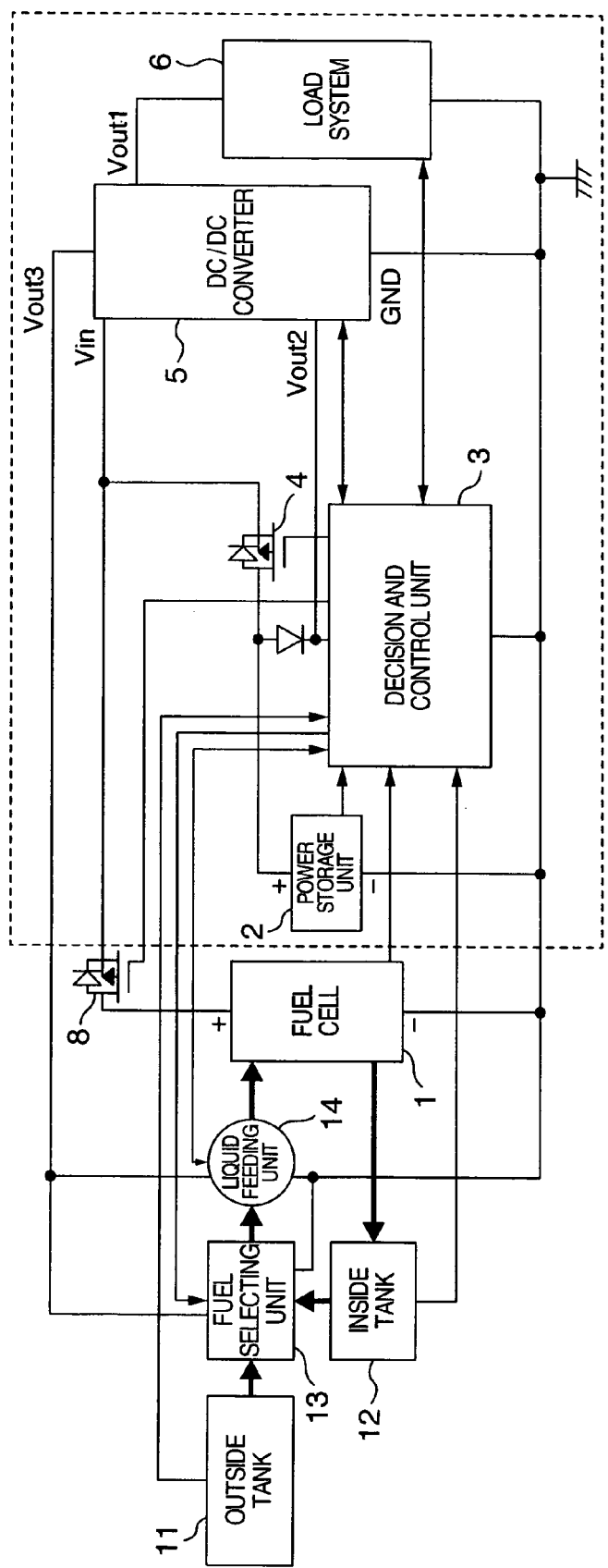
FIG. 11 is a structure in the third embodiment of the present invention.

FIG. 11 shows a third embodiment of the present invention. The fuel cell system according to this embodiment has a structure that the portion indicated by a broken line is incorporated in the load system main body, and the portion other than the broken-line-enclosed region is a battery pack. The feature of this embodiment lies in specifications for the interface to connect between the load system 6 and the fuel cell 1. In addition to a power terminal of the fuel cell 1 and power terminals to the auxiliary devices, the remaining amount signal terminals of the outside fuel tank 11 and the inside fuel tank 12, the interface includes control signal terminals to the auxiliary devices, state signal terminals, such as temperature, of the fuel cell 1, and identification signal terminals of the fuel cell 1 and the power storage unit 2.

Fourth Embodiment

Figure 12:
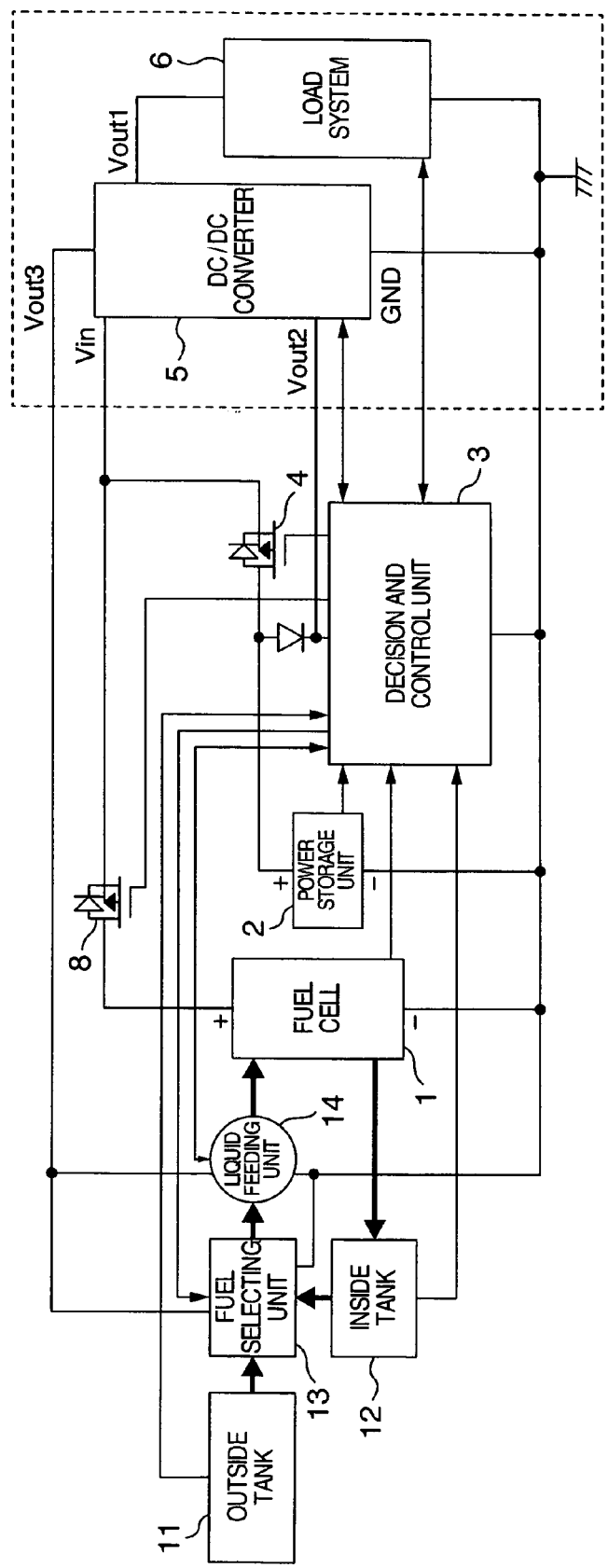
FIG. 12 is a structure in the fourth embodiment of the present invention.

FIG. 12 shows a fourth embodiment of the present invention. The fuel cell system according to the fourth embodiment has a structure that the portion indicated by a broken line is incorporated in the load system main body, and the portion other than the broken-line-enclosed region constitutes a battery pack, but the elements contained in the load system main body are different from those in FIG. 11. The feature of this embodiment resides in specifications for the interface which connects between the load system 6 and the fuel cell 1. The interface includes a power terminal of the fuel cell 1, remaining amount signal terminals, two-way signal terminals connected to the DC-DC converter 5, a state signal terminal, such as temperature, of the fuel cell 1, and identification signal terminals of the fuel cell 1 and the power storage unit 2.

Fifth Embodiment

Figure 16:
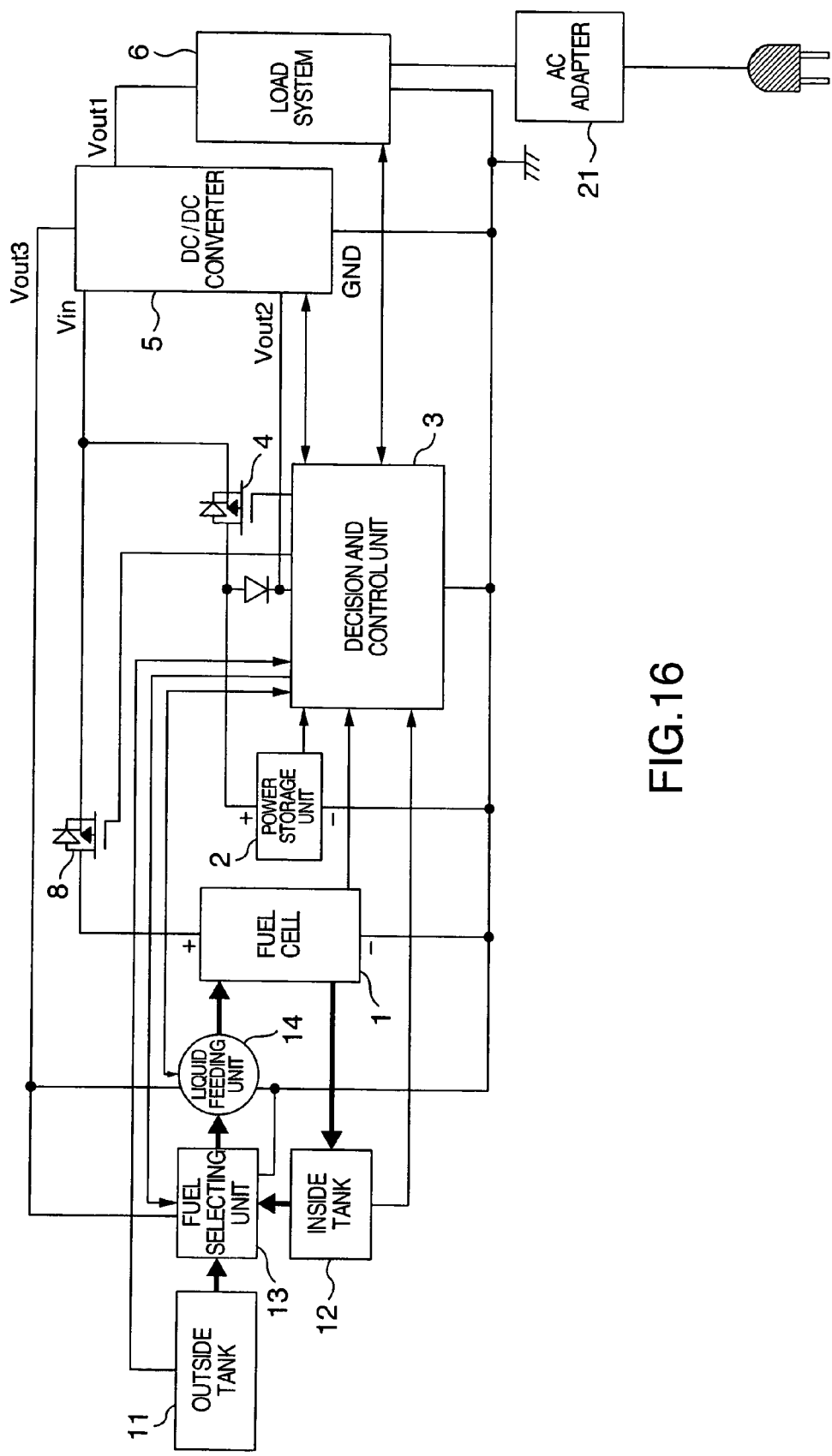
FIG. 16 is a structure in the fifth embodiment of the present invention.

FIG. 16 shows a fifth embodiment of the present invention. The fuel cell system of this embodiment has a structure that power for driving the devices is supplied from a plug outlet in the home, for example. In this embodiment, even if it is detected that an AC adapter 21 is connected to a device, the control method remains the same as in the first embodiment, and under the condition that the AC adapter 21 is connected, when the user turns ON the switch on the device, startup of the fuel cell 1 starts. Regardless of whether an AC adapter 21 is used or not, by starting the fuel cell 1 just as in the first embodiment, power supply to the device 6 does not terminate even if the AC adapter 21 suddenly disconnects.

Detection of connection of the AC adapter is done by communication with the load system side or by detecting a rise of voltage applied to the load system side of the DC-DC converter 5.

Figure 17:
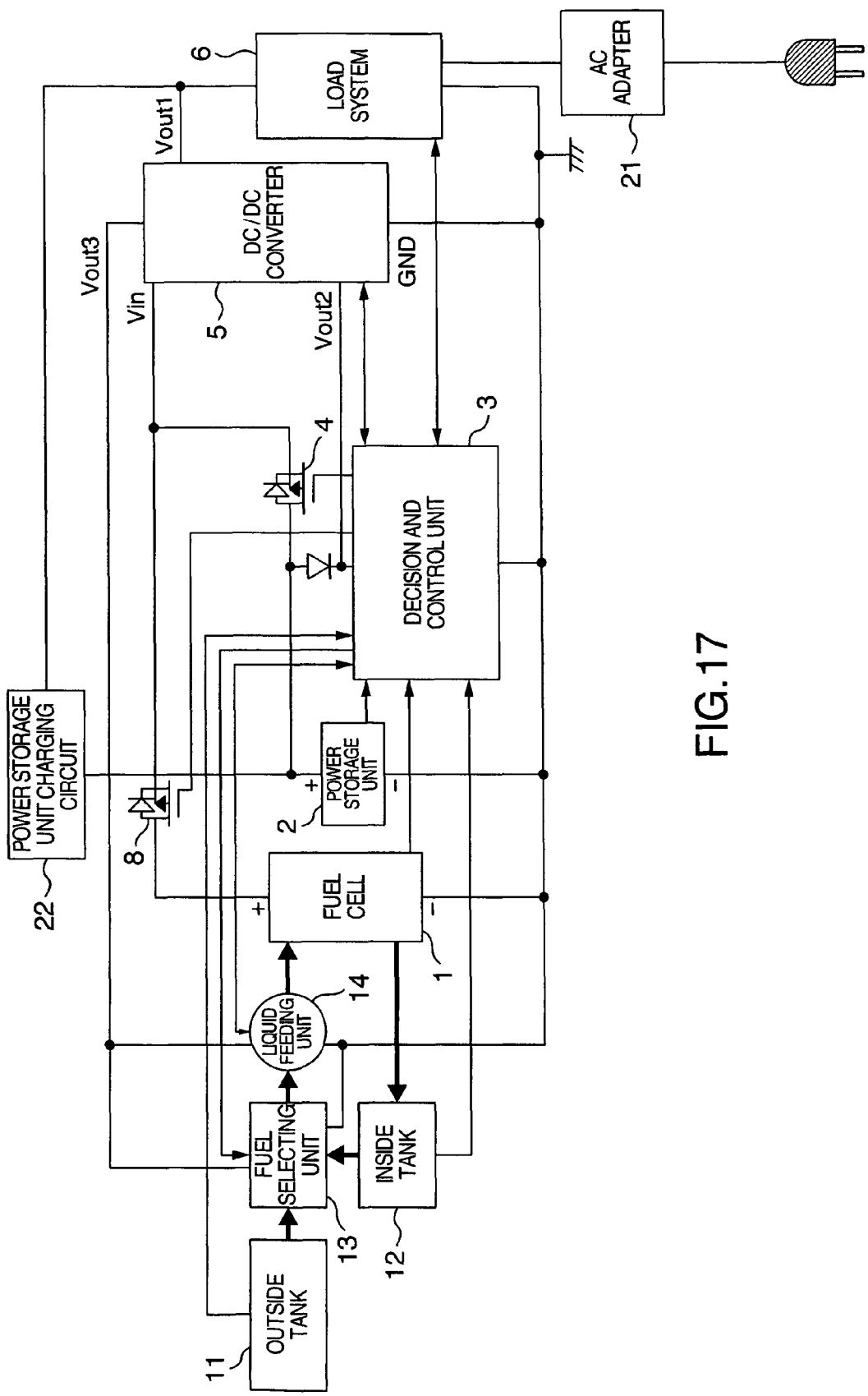
FIG. 17 is a structure in which a power storage unit charging circuit is added in the fifth embodiment of the present invention.

It may be arranged that when the connection of the AC adapter 21 is detected, the power storage unit 2 is charged from the load system side. The structure in this case is shown in FIG. 17. The power storage unit charging circuit 22 has only to be provided with a charging control unit in accordance with the characteristics of the power storage unit 2. It is possible to make an arrangement that constant-current constant-voltage charging is performed by a step-down converter, or another arrangement that charging is performed by only using a constant-current diode to limit the current, or yet another arrangement that charging is performed by using a constant-current diode to limit the current and by using a constant-voltage diode to limit the voltage.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A power supply unit for supplying power to an electronic apparatus as a load, comprising:
    a fuel cell using methanol as fuel;
    a power storage unit;
    a DC/DC converter connected to a circuit including the fuel cell and power storage unit coupled in parallel with each other; and
    a control unit that controls the fuel cell and the power storage unit in response to at least one of a state information signal from the fuel cell, a state information signal from the power storage unit, and a control signal from the electronic apparatus, so as to provide a first period, a second period, and a third period enabling different control of the fuel cell and the power storage unit;
    wherein the DC/DC converter supplies electric power to the electronic apparatus as load;
    wherein the control unit controls the fuel cell and the power storage unit so that during the first period that begins immediately in response to turning on the electronic apparatus, power is supplied to the load from the power storage unit only;
    wherein the control unit further controls the fuel cell and the power storage unit so that during the second period that immediately follows the first period in response to a voltage value of the fuel cell becoming equal to a voltage value of the power storage unit, power is supplied to the load from both the power storage unit and the fuel cell through the DC/DC converter;
    wherein the control unit further controls the fuel cell and the power storage unit so that during the third period that immediately follows the second period in response to the fuel cell output power reaching a required power and/or voltage value for the load, power is supplied to the load from the fuel cell only, and at the same time the power storage unit is charged; and
    wherein by going through the first period, second period, and third period, the temperature of the fuel cell is raised to make the fuel cell ready for supplying a specified steady-state output.

2. The power supply unit according to claim 1, wherein during the second period, a sum of output power of the fuel cell and discharge power of the power storage unit meets the required power value for the load.

3. The power supply unit according to claim 1, wherein during the second period, when the output power of the fuel cell is lower than the required power value for the load, a difference between the required power value for the load and the output power of the fuel cell is a discharging power of the power storage unit.

4. The power supply unit according to claim 1, wherein when the output power of the fuel cell is higher than the required power value for the load, then a difference between the required power value for the load and the output power of the fuel cell is a charging power of the power storage unit.

5. An information apparatus, including the power supply unit that includes a fuel cell and a power storage unit as set forth in claim 1,
    wherein the information apparatus operates on an output power of the power supply unit; and
    wherein the output power of the power supply unit includes at least one of a discharge power of the power storage unit and an output power of the fuel cell.

6. The information apparatus according to claim 5, wherein a sum of the output power of the fuel cell and the discharge power of the power storage unit meets a required power of the apparatus.

7. The information apparatus according to claim 5, wherein when the output power of the fuel cell is lower than the power required by the apparatus, then a difference between the required power and the output power is a discharge power of the power storage unit.

8. The information apparatus according to claim 5, wherein when the output power of the fuel cell is higher than the power required by the apparatus, then a difference between the required power and the output power is a charging power of the power storage unit.

9. The power supply unit according to claim 1, wherein a fuel remaining amount of the fuel cell is monitored and power is controlled, so that a sum of a generatable power amount of the fuel cell and a stored power amount of the power storage unit does not fall below the required power amount of the load.

10. The power supply unit according to claim 1, wherein when power is supplied to the load exclusively from the fuel cell after the second period, but if output of the load rises, then power is supplied to the load from the power storage unit and the fuel cell in parallel.

11. The information apparatus according to claim 5, wherein the fuel cell is turned ON/OFF in a linked relation with the ON/OFF switching of the apparatus, by the user even when power is supplied to the apparatus from an external power source.

12. The power supply unit according to claim 1, wherein the fuel cell is formed by unit fuel cells provided in such a number that a lower-limit design voltage value of the fuel cell in total is higher than a maximum voltage value of the power storage unit.

13. The information apparatus according to claim 7, wherein the power storage unit is a lithium secondary cell, and wherein the fuel cell is formed by at least six unit cells and at most twenty-two unit cells in series.

14. The information apparatus according to claim 7, wherein the power storage unit is an electric double layer capacitor, and wherein the fuel cell is formed by at least four unit cells and at most twenty unit cells in series.

15. The power supply unit according to claim 1, further comprising a switch unit coupled to the output of the fuel cell, that during the first period is responsive to control by the control unit to block a backflow to the fuel cell from the power storage unit, and that during the second and subsequent periods discharges power from the fuel cell.

16. The power supply unit according to claim 1, wherein the control unit carries out switching of period among the first period, second period, and third period based exclusively on the relationship between the voltage of output of the fuel cell and the voltage of the output of the power storage unit.

17. The power supply unit according to claim 1, wherein the DC-DC converter is structured so as to receive power and/or voltage from the fuel cell and/or power storage unit through an input (Vin), and is structured so as to supply different voltages to voltage outputs including a first voltage output (Vout1) for the load, a second voltage output (Vout2) for the control unit, and a third voltage output (Vout3) for auxiliary devices including a fuel selecting unit and a liquid feeding unit of the fuel cell.

18. The power supply unit according to claim 17, wherein the first voltage output (Vout1) and the third voltage output (Vout3) are of a voltage step-up chopper type, and the second voltage output (Vout2) is of a voltage step-down linear regulator type.

19. The power supply unit according to claim 17, wherein when a voltage step-down regulator is built in a DC-DC converter driver, the voltage step-down regulator may be used for the second voltage output (Vout2) to regulate an output voltage.

20. The power supply unit according to claim 1, wherein said at least one of a state information signal from the fuel cell and a state information signal from the power storage unit consists only of voltage values, and is used by the control unit to carry out switching of period among the first period, second period, and third period.

* * * * *